(12) United States Patent
Ushiku

(10) Patent No.: US 7,076,548 B2
(45) Date of Patent: Jul. 11, 2006

(54) USING THE SERVICES OF DIFFERENT DEVICES VIA SERVICE OBJECTS

(75) Inventor: Toyohiko Ushiku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 09/900,036

(22) Filed: Jul. 9, 2001

(65) Prior Publication Data

US 2002/0010777 A1    Jan. 24, 2002

(30) Foreign Application Priority Data

Jul. 18, 2000    (JP)    ............................. 2000-217578

(51) Int. Cl.
   *G06F 13/00*    (2006.01)
(52) U.S. Cl. .................................................. 709/225
(58) Field of Classification Search ............... 705/1, 705/26; 707/1, 2, 3, 4; 709/223, 225; 719/330
   See application file for complete search history.

(56) References Cited

U.S. PATENT DOCUMENTS 5,826,258 A * 10/1998 Gupta et al. .................... 707/4
6,850,901 B1 * 2/2005 Hunter et al. ................. 705/26

* cited by examiner

*Primary Examiner*—Robert B. Harrell
(74) *Attorney, Agent, or Firm*—Fitzpatrick, Cella, Harper & Scinto

(57) ABSTRACT

When a service N provided by a service provider M is accompanied by the use of an accounting service provided by an accounting service provider, a service proxy object n and accounting service proxy object m are acquired. Client information is set in the acquired accounting service proxy object, and the accounting service proxy object holds it. The client information is transferred to the service provider N via the service proxy object n. The service provider N uses the service of the accounting service provider by using the accounting service proxy object which holds the user information.

19 Claims, 17 Drawing Sheets

FIG. 6

```
public class Accounting implements AccountService, Serializable
{
    private UserInformation user ;
    RemoteAccountService service ;

public void pay(int cost){
        service.pay(cost, user) ;
        ............
    }
    public void setUserInformation(UserInformation user){
        this.user = service.encrypt(user) ;
        ............
    }
}
```

FIG. 11

```
public class Accounting implements AccountService, Serializable
{
    RemoteAccountService service ;

public void pay(int cost, SessionID Session){
        service.pay(cost, session) ;
    }
    ............

public SessionID setUserInformation(UserInformation user){
        return service.setUserInformation(user) ;
    }
    ............
}
```

USING THE SERVICES OF DIFFERENT DEVICES VIA SERVICE OBJECTS

FIELD OF THE INVENTION

The present invention relates to an information processing system, apparatus, and method for providing a service on a network, and a storage medium.

BACKGROUND OF THE INVENTION

Systems for setting a service provider which provides a service on a network, searching for or exploring the provided service on the network, and allowing the user to use the service provided by the service provider have recently been developed. These systems provide service by using Jini, UPnP (Universal Plug and Play), SLP (Service Location Protocol), or the like (Jini is a trademark of Sun Microsystems).

As a typical example, a service registration/search/use method using Jini will be described.

FIGS. 12, 13, 14, and 15 are views showing a method of providing a service by Jini. In FIGS. 12 to 15, reference numeral 2010 denotes a network which is represented by the Internet and controlled by the network protocol TCP/IP; 2020, a service provider which provides a service to another node connected to the network; 2030, a Lookup server which provides a Lookup service for registering and searching for a service; 2040, a client which uses a service; 2050, a proxy object executed as a proxy of the service provider on the client; and 2060, a service attribute representing the function of a service used to search for a service.

(1) Search of Lookup Service

As shown in FIG. 12, a server called the Lookup server 2030 in which services are registered operates on the network. This server provides service registration/search as a service (to be referred to as a Lookup service) to the service provider 2020 and the client 2040 serving as a service user.

A Discovery protocol as a network protocol used by the service provider 2020 and client 2040 in order to search for the Lookup server 2030 on the network is defined. The Discovery protocol is defined as a multicast protocol of TCP/IP, and broadcasted to a plurality of nodes on the network.

The Lookup server 2030 which has received a Discovery protocol message sends back a response message to the node which sent the message. The response message includes a class object having a built-in Java Interface (ServiceRegistrar) designed to function as the Lookup service for registering and searching for a service (Java is a trademark of Sun Microsystems).

The service provider 2020 and client 2040 which have received the response message extract the ServiceRegistrar built-in object from the response message, and use it as a proxy object of the Lookup service which provides service registration/search services.

(2) Service Registration

FIG. 13 shows a service registration method. The service provider 2020 uses a Lookup service proxy object to register a service provided by the service provider 2020 itself.

The Lookup service proxy object has a built-in register method as a service registration means. The register method receives as arguments the proxy object 2050 executed as a proxy object on the client side in order to provide a service to the client, and the service attributes 2060 which represent the functions of the service to be provided or the like. Then, the proxy object 2050 and service attributes 2060 are transmitted to the Lookup server 2030. The Lookup server 2030 holds and manages the proxy object 2050 and service attributes 2060 so as to provide them in accordance with a request from the client.

Note that a protocol for transmitting the proxy object 2050 and service attributes 2060 by the register method is not defined in Jini, and depends on the built-in ServiceRegistrar.

(3) Service Search

FIG. 14 shows a service search method. The client 2040 uses the Lookup service proxy object to search for and acquire a service to be used.

The Lookup service proxy object has a built-in lookup method as a service search/acquisition means. The lookup method receives as arguments a Java interface which defines a program interface for identifying the proxy object 2050 executed as a proxy object on the client side in order to provide a service and providing the function of the proxy object 2050, and a template object in which the attributes of a service to be used is built-in as a search condition. This template is transmitted to the Lookup server 2030. The Lookup server 2030 searches held/managed service proxy objects 2050 and service attributes 2060 for a proxy object 2050 which meets the transmitted template condition. The searched proxy object 2050 is sent back as the return value of the lookup method to the client 2040.

Note that a protocol for transmitting the template and proxy object 2050 by the lookup method is not defined in Jini, and depends on the built-in ServiceRegistrar.

(4) Service Use

FIG. 15 shows a service use method.

The client 2040 uses the proxy object 2050 to use a service. Jini defines a Java interface as a program/interface for using a service. The proxy object 2050 has the built-in Java interface. The client can receive a service by using the method provided by the interface.

How to build the defined interface into the proxy object 2050 depends on the service provider, and the Java interface built-in method does not influence the programming of the client. A service can be used regardless of the Lookup server 2030.

A problem to be solved by the present invention will be explained with reference to the example of FIGS. 16 and 17. In FIGS. 16 and 17, reference numeral 3010 denotes a client which receives a service; 3020, an A service provider which provides service A; 3030, an accounting service provider which provides an accounting service for paying fees for receiving a service; 3040, an A service proxy object serving as a proxy of the A service provider on the client 3010 for providing service A; and 3050, an accounting service proxy object 3050 serving as a proxy of the accounting service provider 3030 on the client 3010 in order to provide an accounting service.

In a normal mechanism, as shown in FIG. 16, the client 3010 acquires proxy objects for the A service and accounting service, i.e., the A service proxy object 3040 and accounting service proxy object 3050, and in exchanging information between services, must relay the information exchange, which increases the load on the client.

To solve this, according to the present invention as shown in FIG. 17, the accounting service proxy object 3050 is transferred to the A service provider 3020, personal information of the client 3010 is set via the A service provider 3020, and the A service provider 3020 directly uses the accounting service provided by the accounting service provider 3030.

In this configuration, the accounting service is received via the A service provider, which may cause leakage of client's personal information. Further, since the object which receives a service is different from the A service provider, the accounting service provider does not recognize that the A service provider 3020 uses the accounting service provider 3030 for the client 3010, but recognizes that the A service provider 3020 itself newly uses the accounting service provider 3030.

SUMMARY OF THE INVENTION

The present invention has been made to overcome the conventional drawbacks, and has as its object to reduce the processing burden on the user in using a second service of a different service provider together with the use of a first service.

It is another object of the present invention to improve the security when the second service requests personal information in using the second service together with the use of the first service.

The present invention provides an information processing method executed by the information processing system and apparatus. In addition, the present invention provides a storage medium which stores a control program for implementing the information processing system or apparatus by a computer.

In one aspect, the present invention is an information processing system comprising acquisition means for acquiring a first service object from a first service providing device and a second service object from a second service providing device via a network in a user device, setting means for setting user information in the second service object acquired by said acquisition means, in the user device, and causing the second service object to hold the user information, transfer means for transferring the second service object which holds the user information to the first service providing device, and service use means for providing a service of the second service providing device to the first service providing device by causing the second service object transferred to the first service providing device to use the user information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an example of the accounting service proxy object according to the first embodiment;

FIG. 11 is a view showing an example of an accounting service proxy object according to the second embodiment;

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

The first embodiment will be described by exemplifying a case using the Java language. However, it will be apparent to those skilled in the art from the following description that the present invention does not depend on the Java language and can be implemented by using another programming language. The following embodiment will be explained using a combination of a given service and accounting service. However, the accounting service need not always be included, and the present invention can be applied to a combination of any services.

Figure 1:
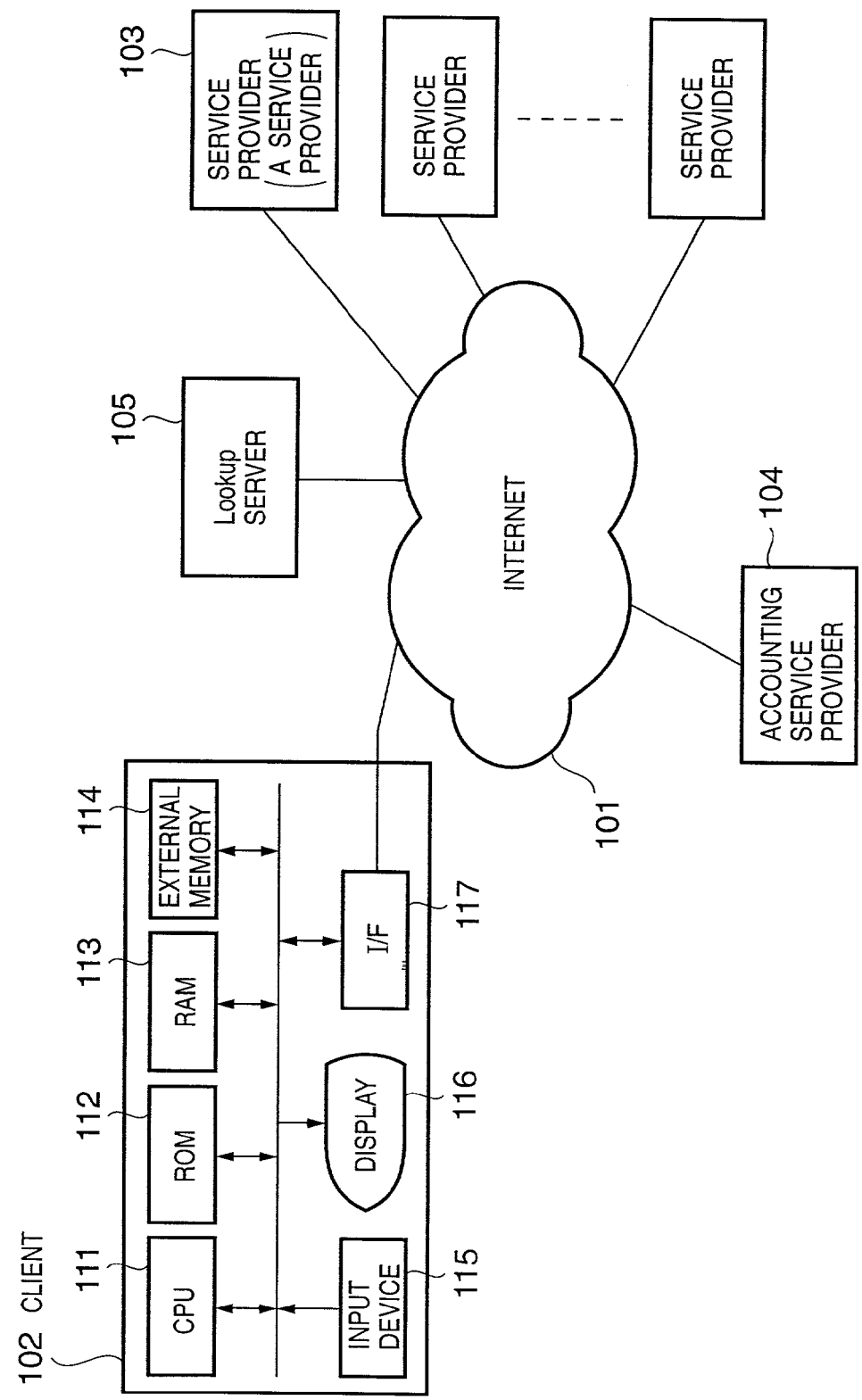
FIG. 1 is a block diagram showing the arrangement of an information service system according to the first embodiment.

FIG. 1 is a block diagram showing the arrangement of an information service system according to the first embodiment. In FIG. 1, reference numeral 101 denotes a network which connects a plurality of information processing apparatuses and is the Internet in the first embodiment; 102, a client which uses each service; 103, a service provider which provides various services; and 104, an accounting service provider which provides an accounting service. The service provider 103 and accounting service provider 104 provide services by using Jini. Hence, the client 102 receives the provided services by using Jini.

Reference numeral 105 denotes a Lookup server which registers the services of the service provider 103, accounting service provider 104, and the like, and searches for and provides registered services in accordance with a request from the client.

The client 102, service provider 103, accounting service provider 104, and Lookup server 105 are respectively constituted by computers. A typical arrangement is illustrated for the client 102. A CPU 111 executes various control operations in accordance with a control program stored in a memory. A ROM 112, RAM 113, and external memory 114 provide memories for providing the control program and various work areas of the CPU 111. An input device 115 is made up of a keyboard, pointing device, and the like, and allows the operator to input various inputs. Reference numeral 116 denotes a display which displays various displays under the control of the CPU 111; and 117, a network interface which connects the network 101 to the computer.

Although the typical arrangement is illustrated for the client 102, the computers of the service provider 103, accounting service provider 104, and Lookup server 105 also have similar arrangements.

Figure 2:
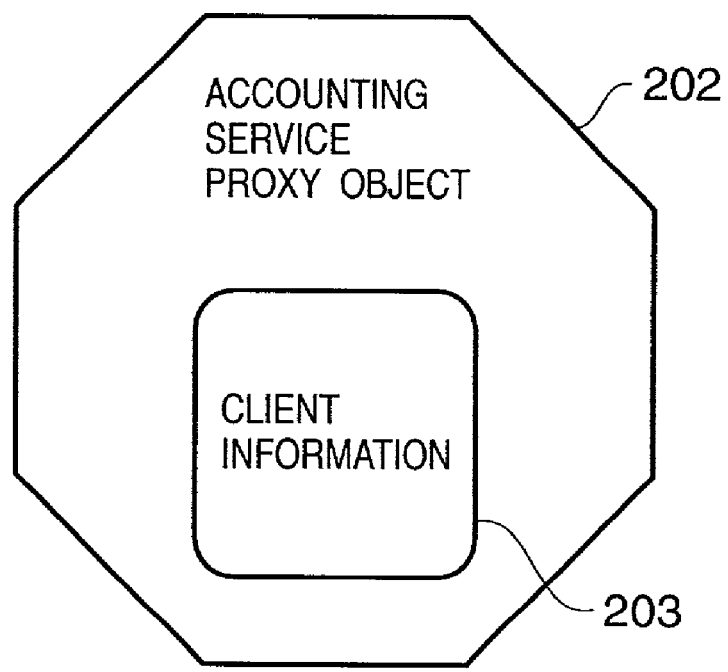
FIG. 2 is a view showing the structure of an accounting service proxy object according to the first embodiment.

FIG. 2 is a view showing the structure of an accounting service proxy object according to the first embodiment. In FIG. 2, reference numeral 202 denotes an accounting service proxy object; and 203, client information for identifying a client which uses an accounting service.

Figure 16:
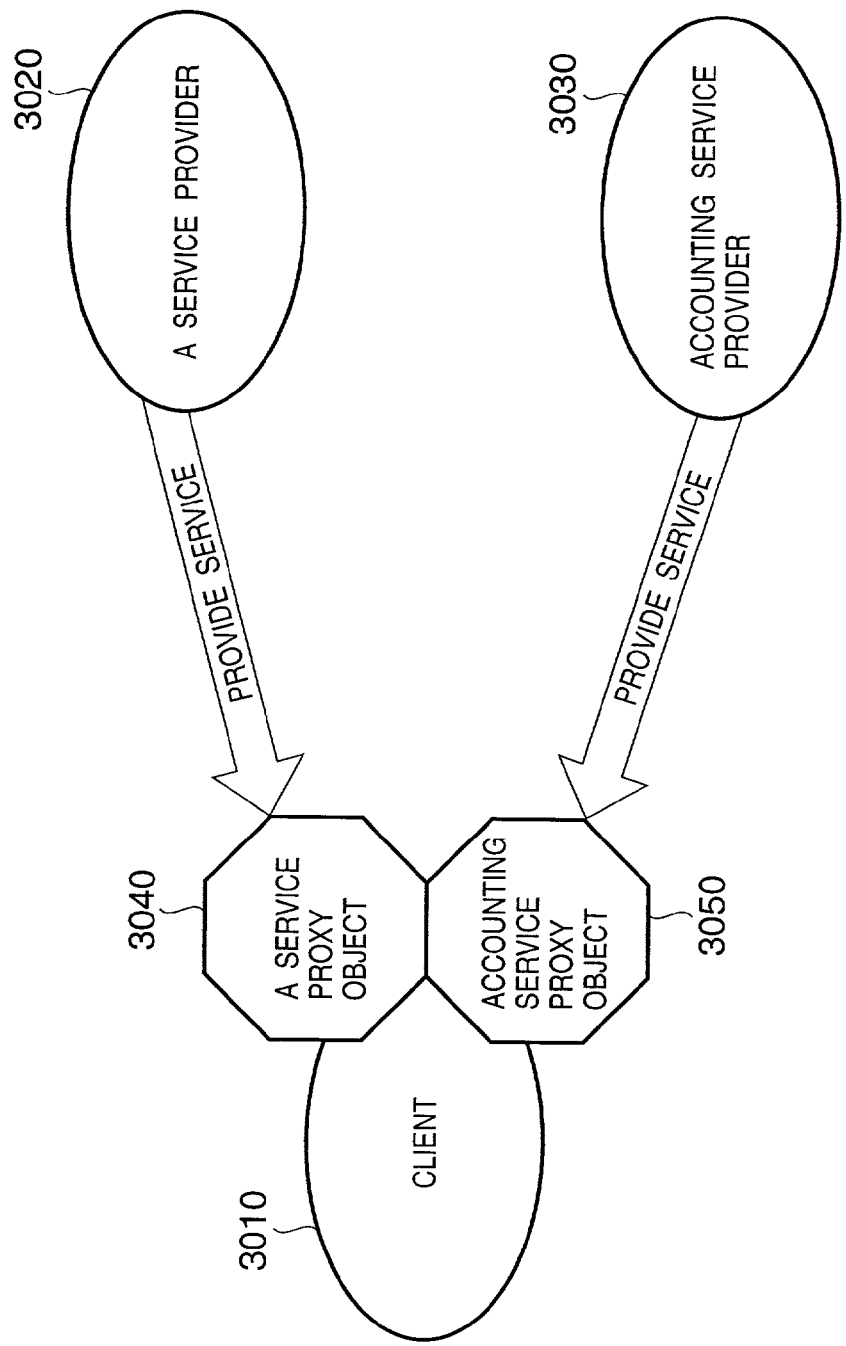
FIG. 16 is a view showing a general service providing form in the use of another service.
Figure 17:
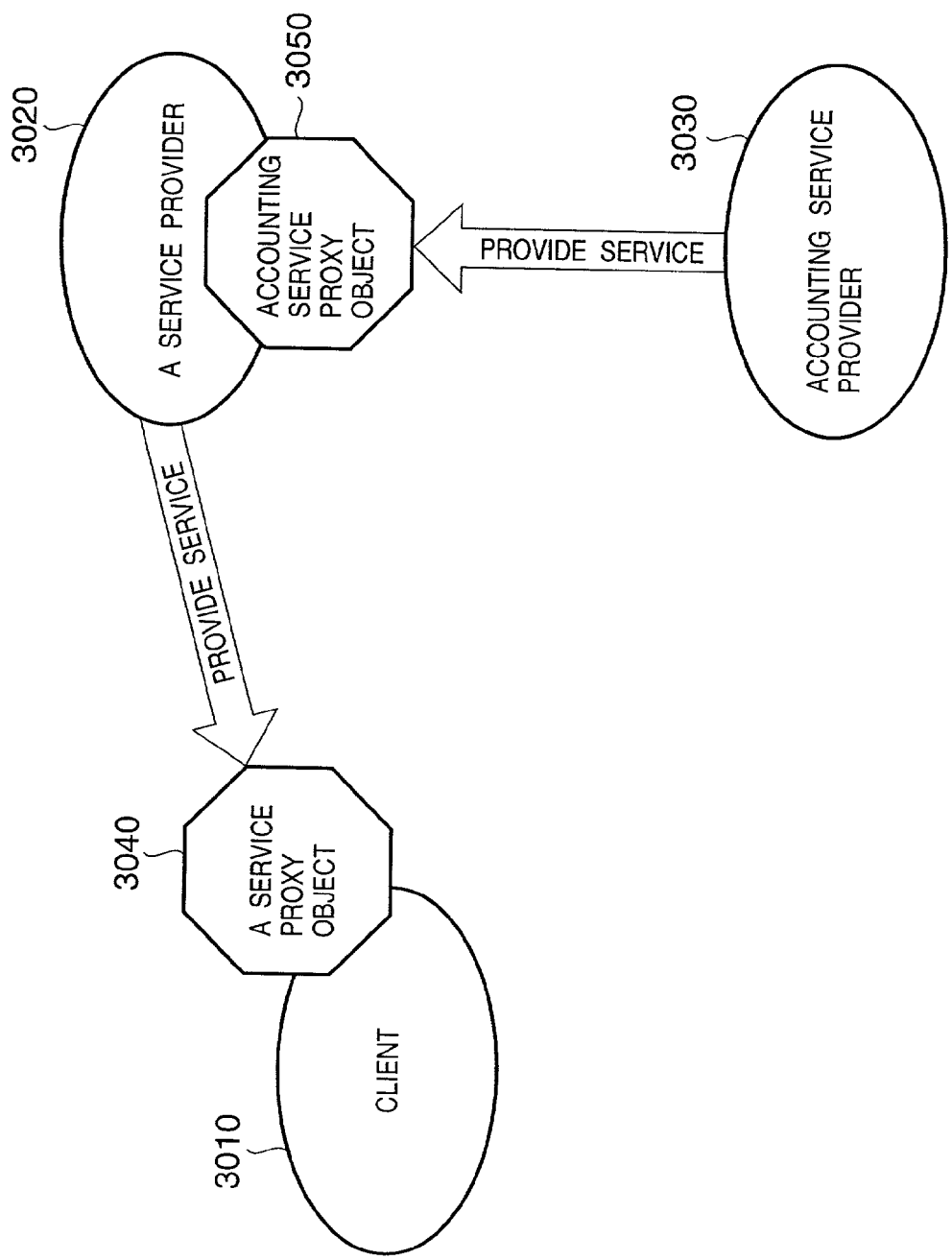
FIG. 17 is a view showing another general service providing form in the use of another service.

The first embodiment releases the client from the burden of relaying information exchange between the service of an A service proxy object as shown in FIG. 16 and the service of the accounting service proxy object, and prevents leakage of personal information in the system shown in FIG. 17. To prevent leakage of personal information, the client 102 sets client information to the accounting service provider, and the A service provider 103 uses the accounting service while taking over the state in which the client information is set.

For this purpose, according to the first embodiment, the client 102 acquires the accounting service proxy object 202 and sets the client information 203 in the accounting service proxy object 202, and the accounting service proxy object 202 holds the client information 203. The accounting service proxy object 202 in which the client information 203 is set is provided to the A service provider 103, thus handing over the service. The operation of the first embodiment will be explained in detail.

A case wherein the accounting service of the accounting service provider 104 is used in using the A service of the A service provider 103 will be described.

Figure 3:
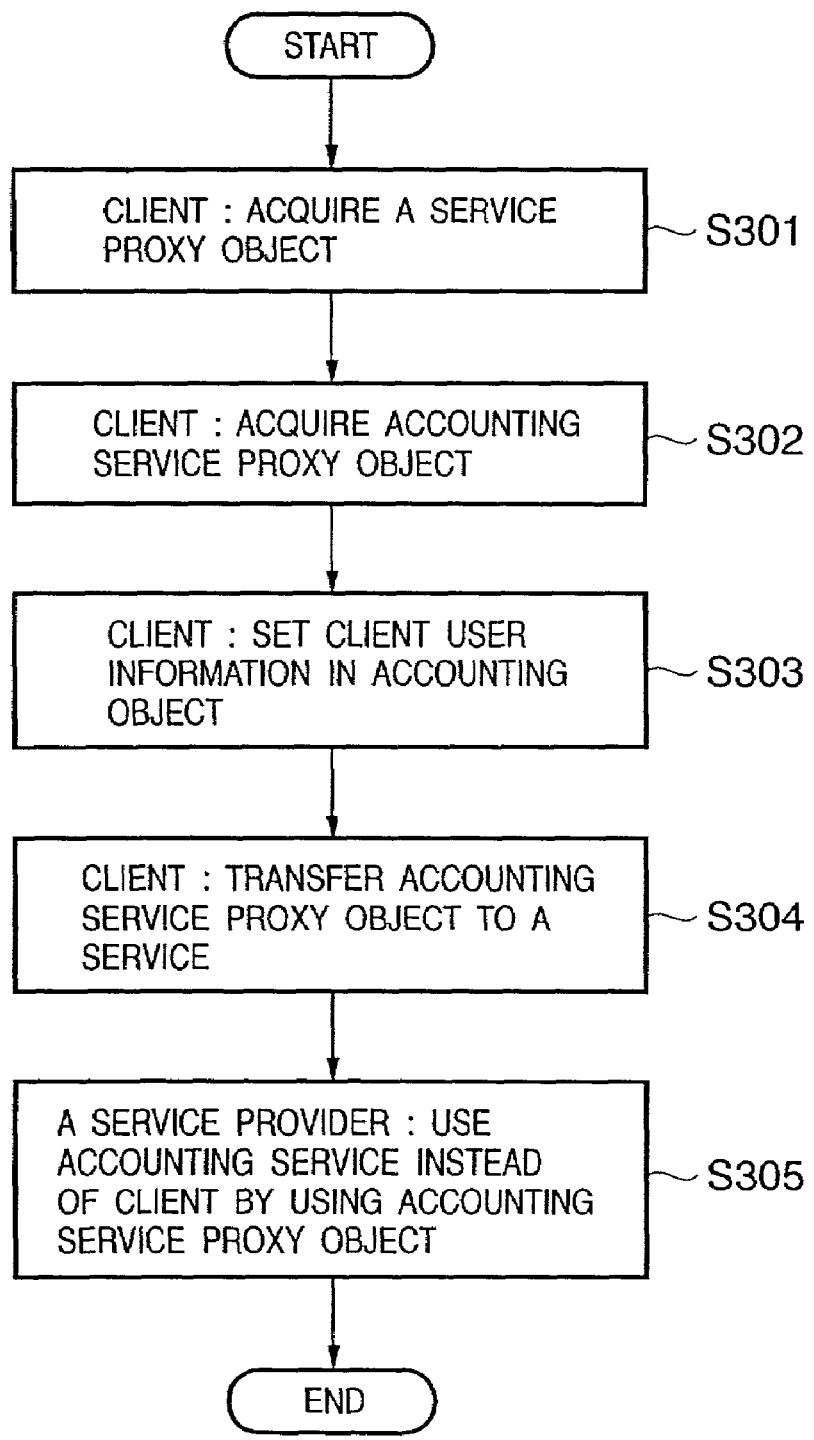
FIG. 3 is a flow chart for explaining the processing sequence of the information service system according to the first embodiment.
Figure 4:
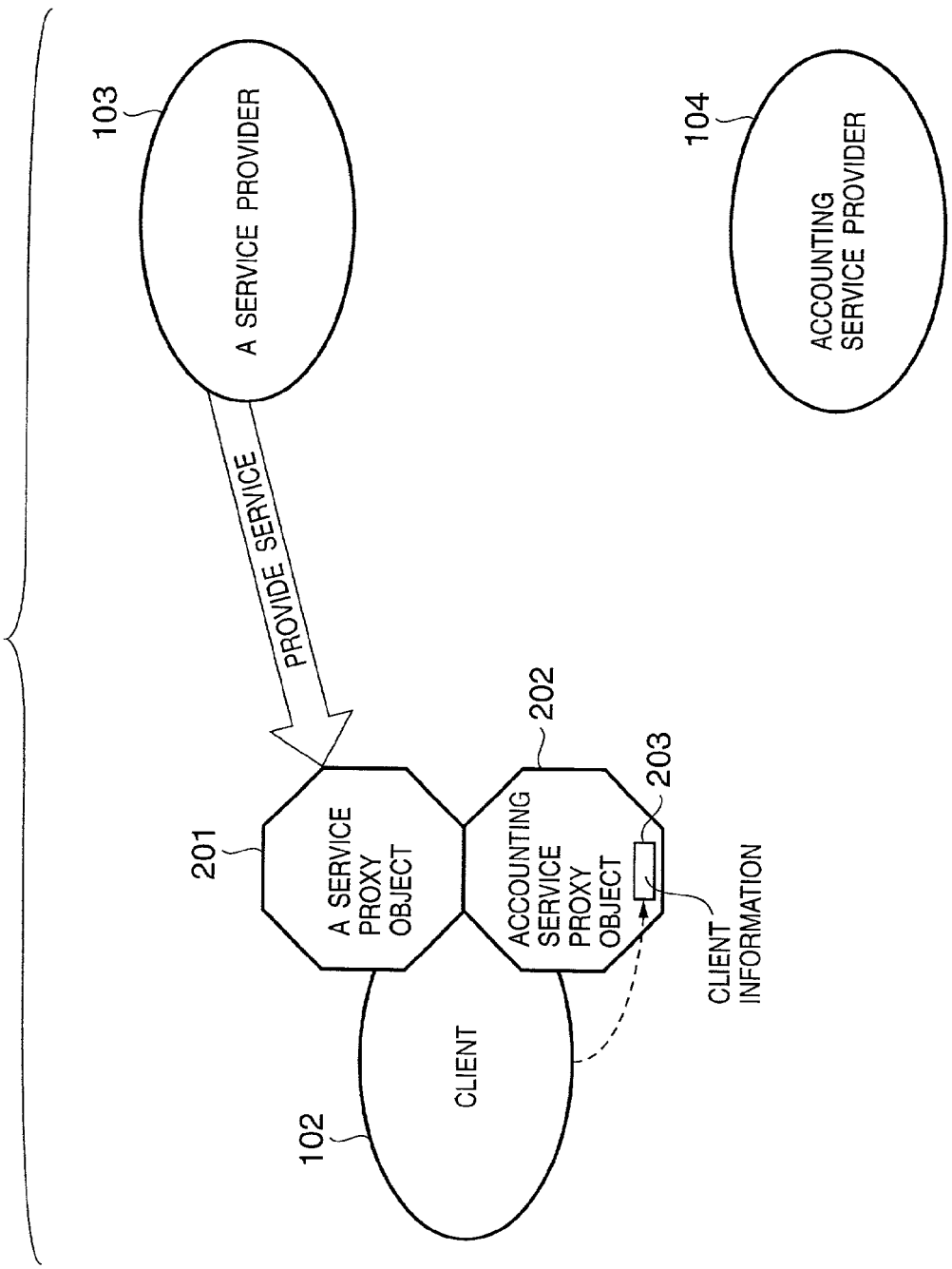
FIG. 4 is a view for explaining a service providing form according to the first embodiment.
Figure 5:
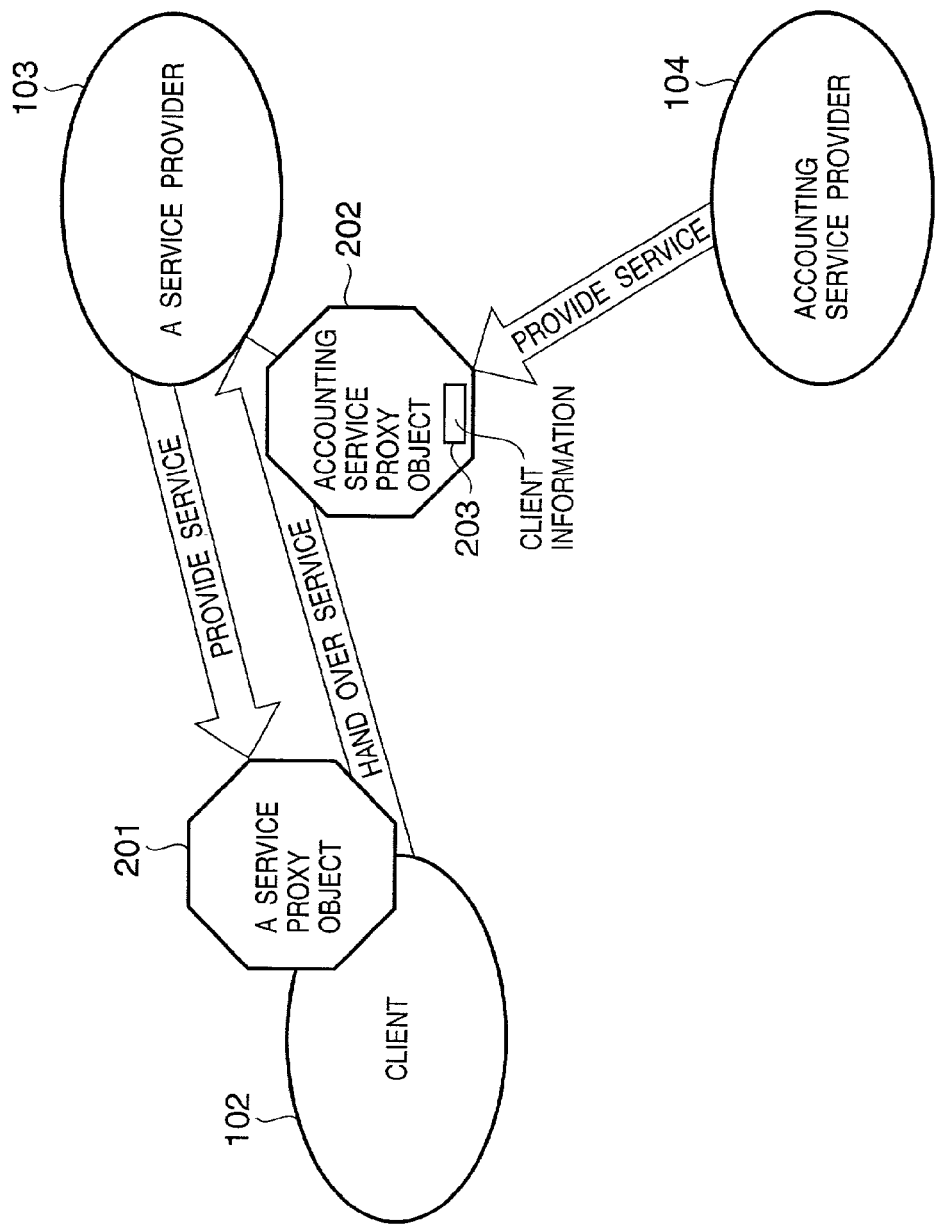
FIG. 5 is a view for explaining the service providing form according to the first embodiment.

FIG. 3 is a flow chart for explaining the processing sequence of the information service system according to the first embodiment. FIGS. 4 and 5 are views for explaining a service providing form according to the first embodiment. FIG. 6 is a view showing an example of the accounting service proxy object according to the first embodiment. In this example, the service provided by the A service provider 103 assumes to require the accounting service provided by the accounting service provider 104.

Figure 13:
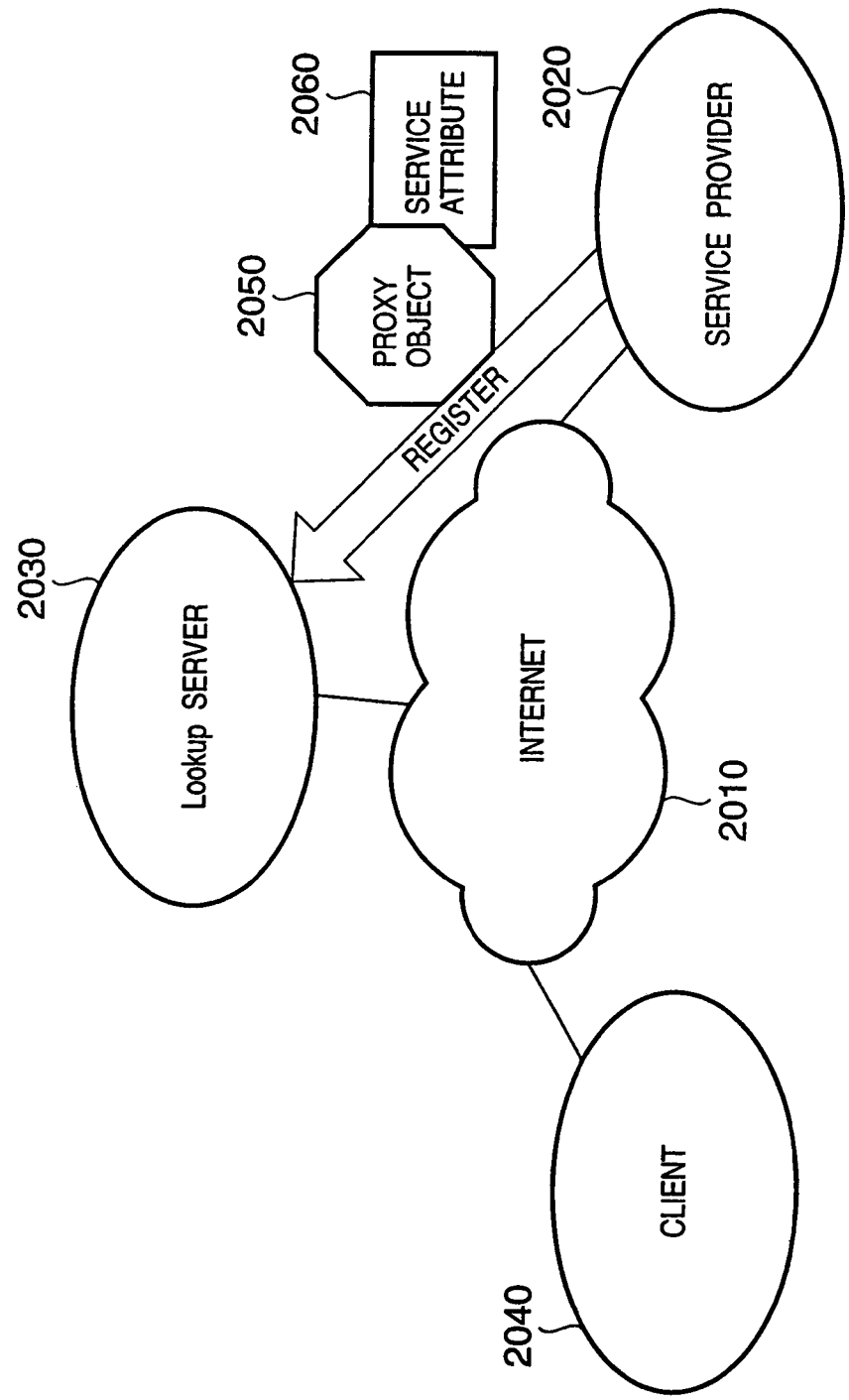
FIG. 13 is a view for explaining another service providing form by Jini.
Figure 14:
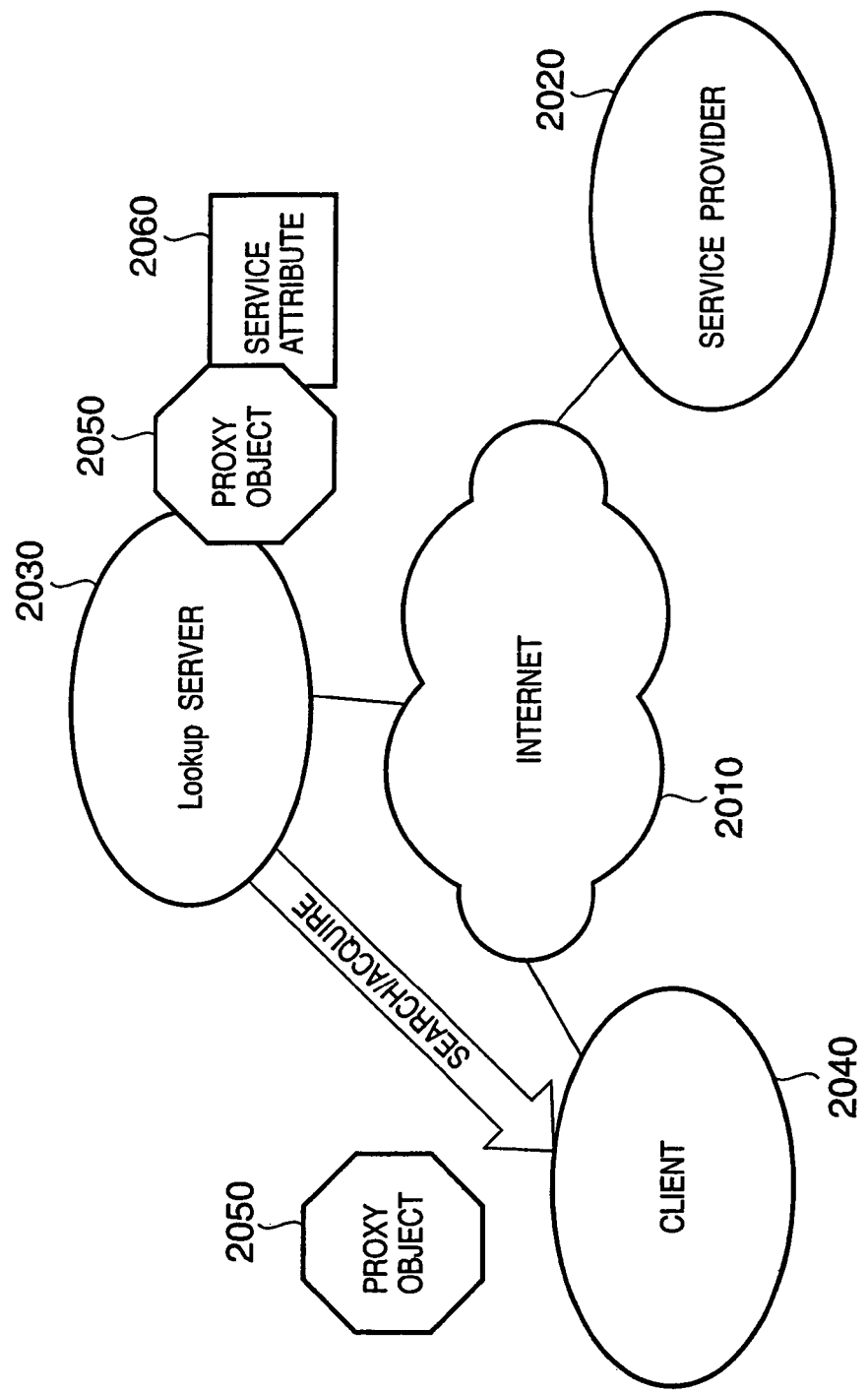
FIG. 14 is a view for explaining still another service providing form by Jini.
Figure 15:
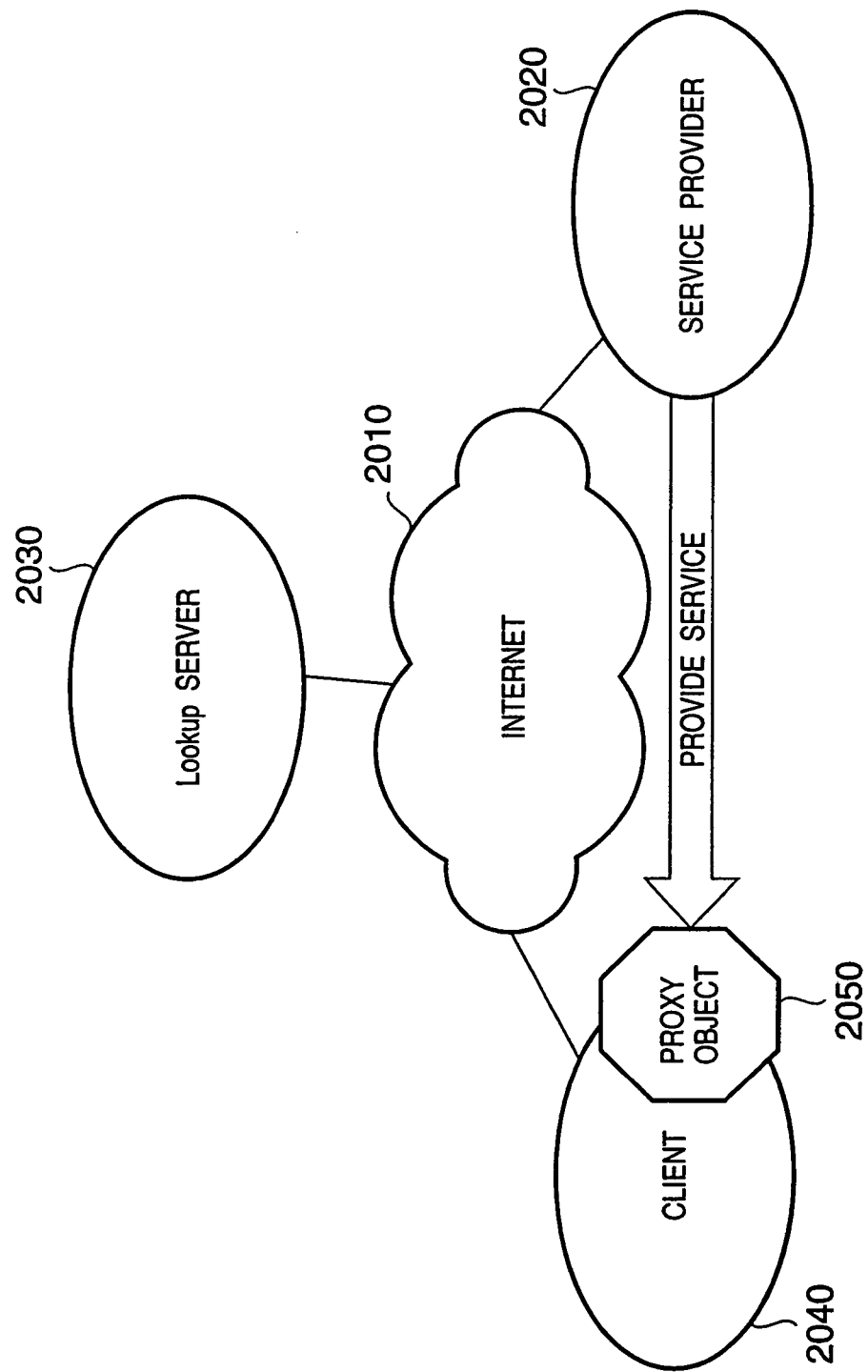
FIG. 15 is a view for explaining still another service providing form by Jini.

In step S301, the client 102 acquires an A service proxy object 201 from the Lookup server 105 by the method described with reference to FIGS. 13 and 14 (see FIG. 4). If the A service proxy object 201 is executed to find the necessity for the accounting service of the accounting service provider 104, the client 102 acquires the accounting service proxy object 202 from the Lookup server 105 in step S302, similar to step S301 (see FIG. 4). In the first embodiment, the client 102 acquires the A service proxy object 201 and accounting service proxy object 202 from the single Lookup server 105, but the present invention is not limited to this. That is, the Lookup server from which the A service proxy object 201 is acquired in step S301 need not be the same as the Lookup server from which the accounting service proxy object 202 is acquired in step S302.

In step S303, the client program sets the client information 203 by the setUserInformation method (see FIG. 6) of the accounting service proxy object 202 (see FIG. 4). In this setting, the accounting service provider 104 is not notified of the client information 203, and the client information 203 is held in the accounting service proxy object 202. Setting of the client information 203 will be explained in detail. For example, the contents of the client information 203 are a bank name, account number, and password used for payment. The pieces of information are set in the UserInformation object in the setUserInformation method of FIG. 6, and transferred to the accounting service proxy object 202. The accounting service proxy object 202 encrypts the UserInformation object (client information 203) by using a public key or the like, and holds it as the internal information of the accounting service proxy object 202.

The held client information 203 cannot be directly referred from another method or object, and the user variable cannot be accessed by an object other than the accounting service proxy object. Thus, the A service provider cannot directly access or refer to the client information 203.

In step S304, the client 102 transfers the accounting service proxy object 202 to the A service provider 103 via the A service proxy object 201. In other words, the client 102 hands over the accounting service proxy object 202 to the A service provider 103 so as to allow the A service provider 103 to use the accounting service of the accounting service provider 104 (see FIG. 5). In handing over the accounting service proxy object 202, the accounting service proxy object 202 is serialized by the RMI (Remote Method Invocation) and Serialize mechanisms of the Java language execution environment and sent as network data (serial data) to the A service provider 103 where the accounting service proxy object to which the client information is set as an inside information, is reconstructed based on the serialized data. This inhibits the A service provider from directly accessing the client information 203.

In step S305, the A service provider 103 uses the accounting service of the accounting service provider 104 via the accounting service proxy object 202 handed over from the client 102. As represented by the pay method in FIG. 6, the A service provider uses the accounting service by using the client information 203 set in the accounting service proxy object 202 by the client 102 in step S303 as if the client 102 used the accounting service.

In the pay method, the encrypted client information 203 held by the accounting service proxy object 202 is transferred to the accounting service provider 104. The accounting service provider 104 decrypts the encrypted accounting information and the like, and performs debit processing from the bank account on the basis of the pieces of information.

In the first embodiment, the accounting service proxy object 202 encrypts the client information 203 in step S303. Alternatively, when the client information 203 is set in the UserInformation object, it may be temporarily transferred to and encrypted by the accounting service provider 104, and then held in the accounting service proxy object 202.

The first embodiment has exemplified the accounting service, but another service can also be handed over by the same method. For example, personal authentication can be received from an authentication service and handed over to another service to guarantee that personal authentication is granted by the service.

As described above, according to the first embodiment, the client need not relay the first and second services in using the second service (accounting service) along with the use of the first service (A service).

According to the first embodiment, the proxy object of the second service holds necessary personal information, and the use of the second service is handed over to the provider of the first service. The security is improved without laying open any personal information to the provider of the first service.

Second Embodiment

The second embodiment will be described. In the first embodiment, the client 102 sets the client information 203 in the accounting service proxy object 202, and the A service provider 103 uses the accounting service by exploiting the client information 203, thereby improving the security of client information. In the second embodiment, the security is improved by using a session ID established between the client and the accounting service provider, in addition to client information.

The arrangement of an information service system according to the second embodiment is the same as that according to the first embodiment (FIG. 1). The second embodiment will also exemplify a case using the Java language. However, the present invention does not depend on the Java language and can be implemented by using another programming language.

A case wherein a program executed by a client 102 uses the service of an A service provider 103 will be exemplified with reference to FIGS. 7 to 11. Similar to the first embodiment, the service of the A service provider 103 uses that of an accounting service provider 104.

Figure 7:
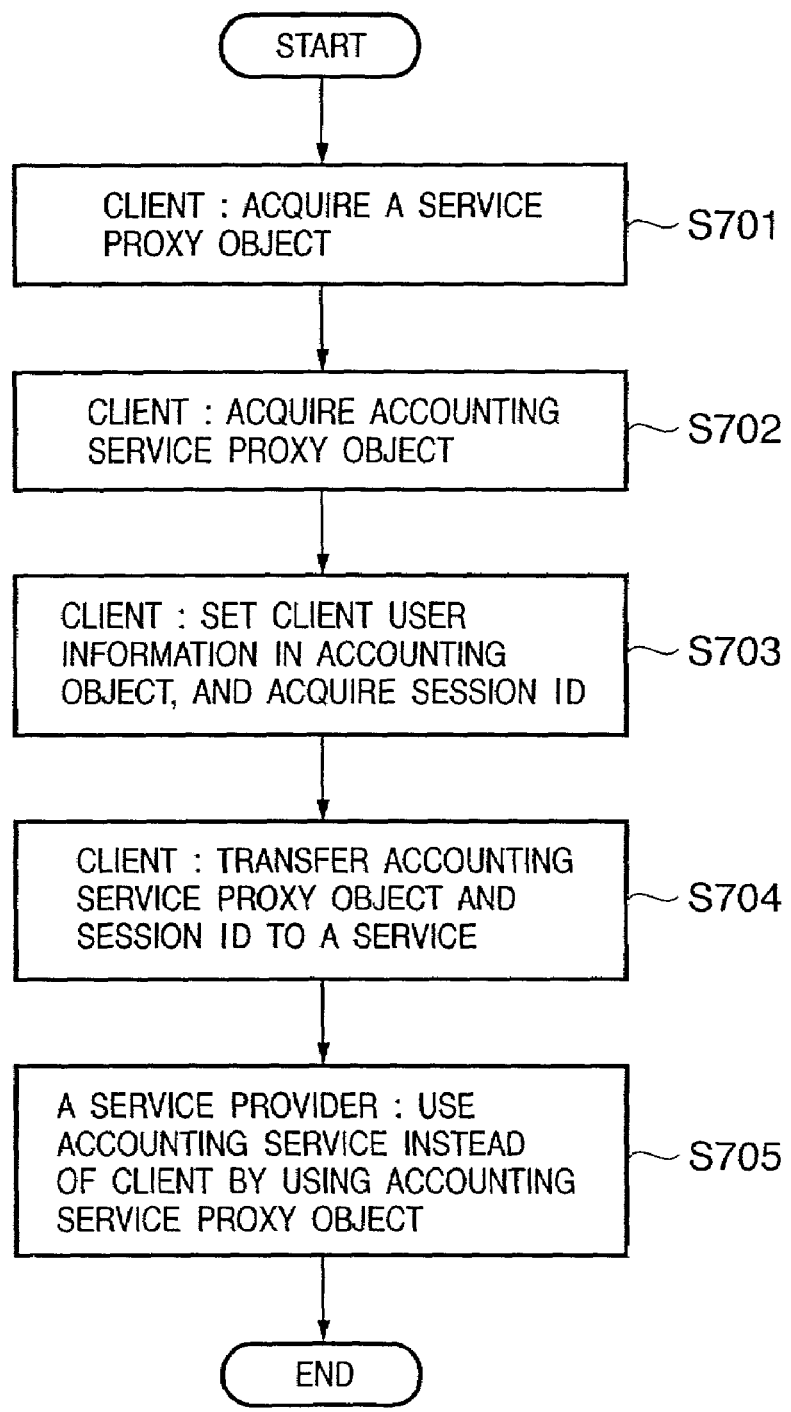
FIG. 7 is a flow chart for explaining the processing sequence of an information service system according to the second embodiment.
Figure 8:
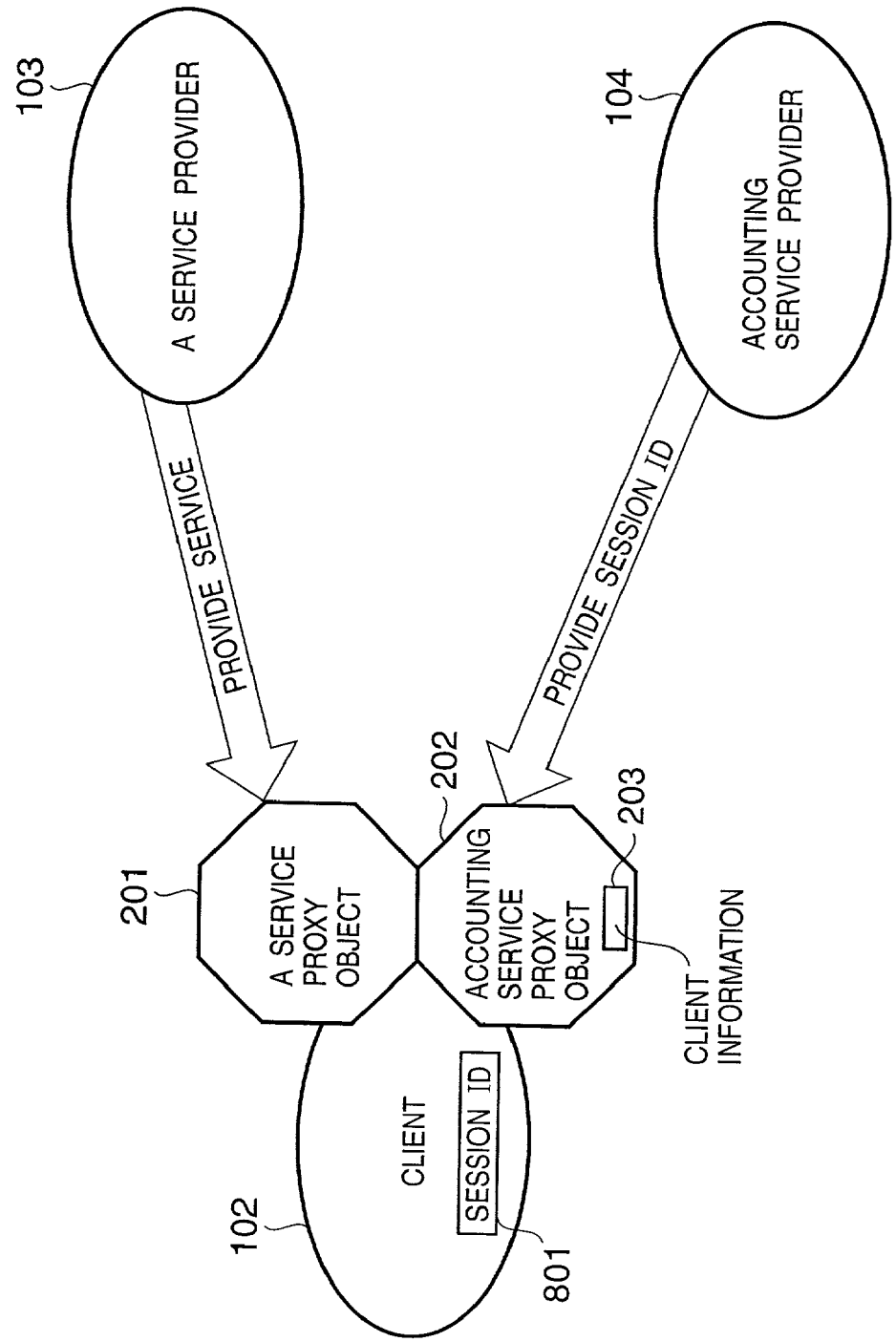
FIG. 8 is a view for explaining a service providing form according to the second embodiment.
Figure 9:
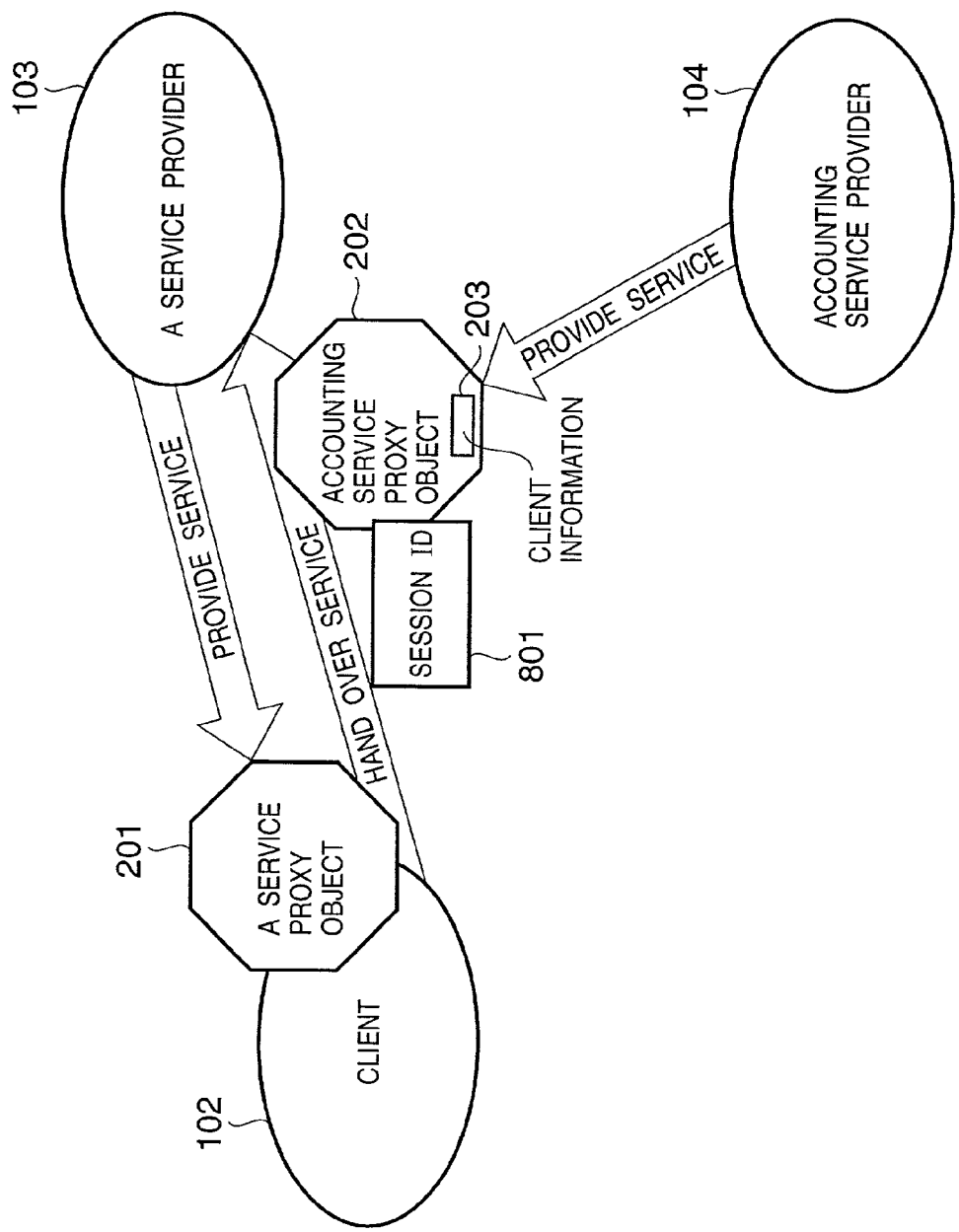
FIG. 9 is a view for explaining the service providing form according to the second embodiment.
Figure 10:
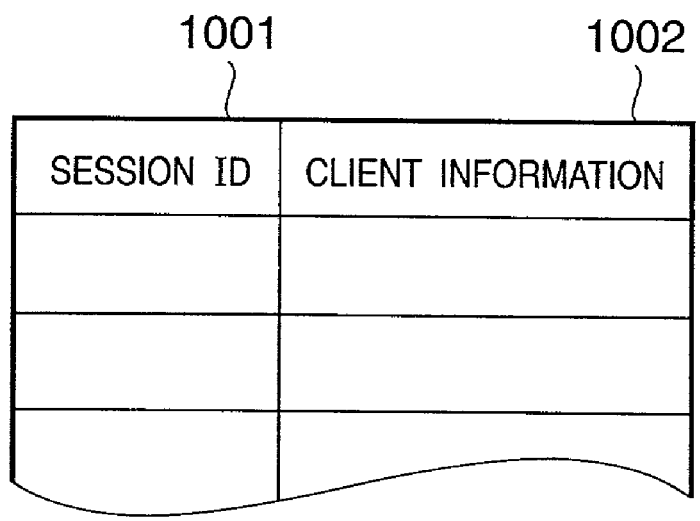
FIG. 10 is a table for managing a pair of a session ID and client information used within an accounting service provider.
Figure 12:
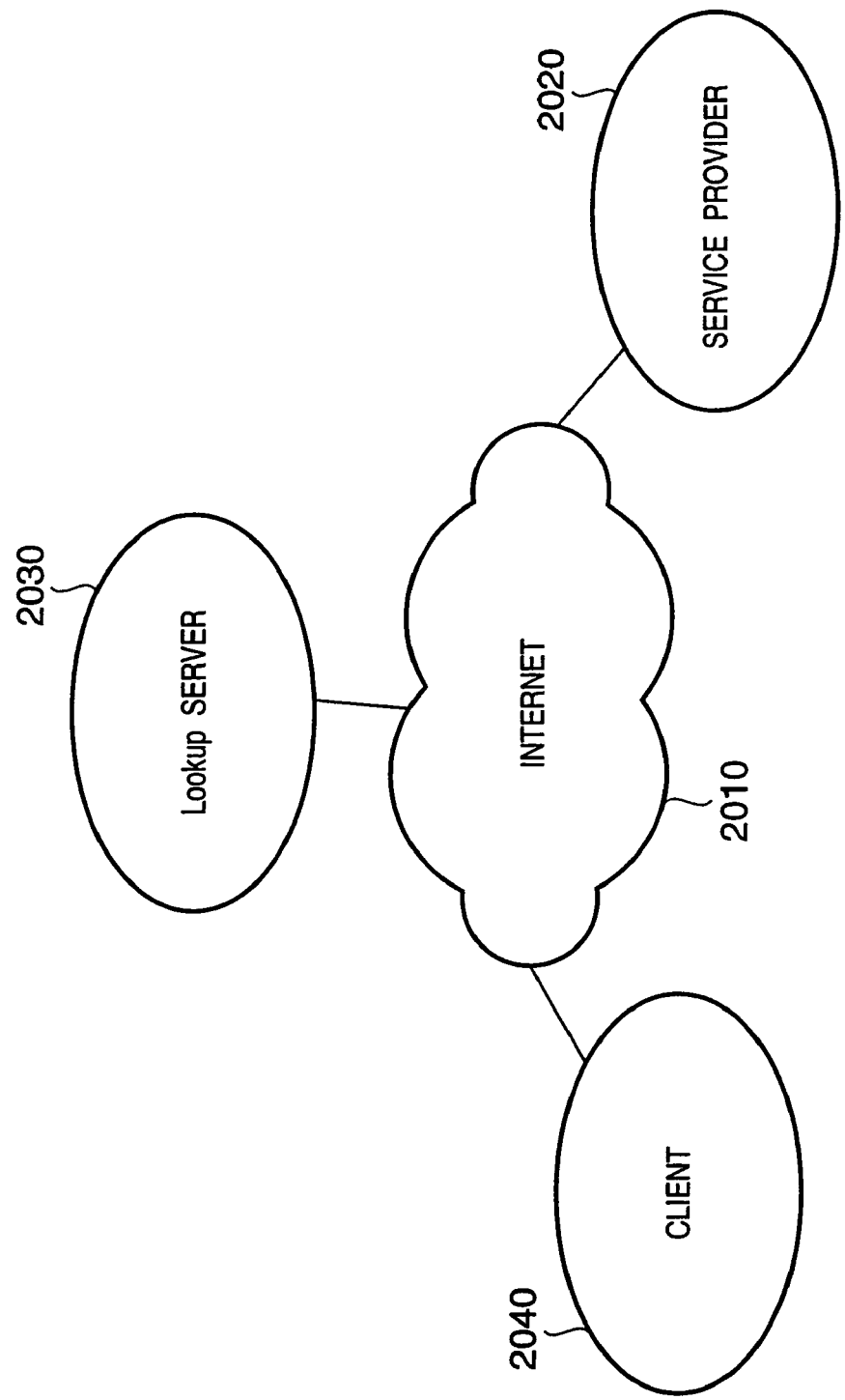
FIG. 12 is a view for explaining a service providing form by Jini.

FIG. 7 is a flow chart for explaining the processing sequence of the information service system according to the second embodiment. FIGS. 8 and 9 are views for explaining a service providing form according to the second embodiment. FIG. 10 is a table for managing a pair of a session ID and client information used within the accounting service provider. FIG. 11 is a view showing an example of an accounting service proxy object according to the second embodiment.

In step S701, the client 102 acquires an A service proxy object 201 from a Lookup server 105 by the method described with reference to FIGS. 13 and 14 (see FIG. 8). In step S702, similar to step S701, the client 102 acquires an accounting service proxy object 202 from the Lookup server 105 (see FIG. 8). In the second embodiment, the client 102 acquires the A service proxy object 201 and accounting service proxy object 202 from the single Lookup server 105, but the present invention is not limited to this. That is, the Lookup server from which the A service proxy object 201 is acquired in step S701 need not be the same as the Lookup server from which the accounting service proxy object 202 is acquired in step S702.

In step S703, the client program sets client information 203 by the setUserInformation method (see FIG. 11) of the accounting service proxy object 202 (see FIG. 8). In this setting, the accounting service provider 104 is notified of the client information 203 via the accounting service proxy object 202. The accounting service provider 104 which has been notified of the client information 203 interprets that a series of accounting service sessions newly start, generates a new session ID 801, and sends it back to the client 102 via the accounting service proxy object 202.

Note that the accounting service provider 104 registers in the table the notified client information 203 and the session ID 801 assigned to the client information 203, and uses them for authentication in providing a service (see FIG. 10).

In step S704, the client 102 hands over the accounting service proxy object 202 and the session ID 801 acquired from the accounting service to the A service provider 103 so as to use the accounting service proxy object 202 via the A service proxy object 201 (see FIG. 9). In handing over the accounting service proxy object 202 and session ID 801, the accounting service proxy object 202 and session ID 801 are serialized by the RMI and Serialize mechanisms of the Java language execution environment and sent as network data to the A service provider where the accounting service proxy object 202 to which the client information is set as an inside information, and the session ID 801 are reconstructed based on the serialized data.

In step S705, the A service provider 103 uses the accounting service via the accounting service proxy object 202 handed over from the client 102. As represented by the pay method in FIG. 11, the A service provider 103 uses the accounting service of the accounting service provider 104 by using the session ID 801 acquired from the accounting service provider 104 in step S704. Authentication is executed within the accounting service provider 104 by checking the session ID and client information with reference to the table shown in FIG. 10, and the A service provider 103 executes the accounting service as if the client 102 used the accounting service. For example, when the contents of the client information 203 are a bank name, account number, and password used for payment, the pieces of information are stored in client information 1002 of FIG. 10. In the pay method, since the session ID has been transferred, the session ID and client information 203 are sent to the accounting service provider. The accounting service provider 104 refers to the table of FIG. 10 by using the received session ID as a key, obtains client information, and collates the received client information 203 with the client information. If collation is "OK", debit processing from the bank account is performed in accordance with the client information 203.

The second embodiment has exemplified the accounting service, but another service can also be handed over by the same method.

As described above, according to the second embodiment, the use of a session ID established between the client and the accounting service provider in addition to client information can improve the security more than the arrangement of the first embodiment.

According to each of the above embodiments, a service necessary for the client that is searched for by the client can be provided as if the client received another service.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy disk, hard disk, optical disk, magnetooptical disk, CD-ROM, CD-R, magnetic tape, nonvolatile memory card, and ROM.

The functions of the above-described embodiments are realized not only when the computer executes the readout program codes, but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, the present invention can reduce the processing burden on the user in using a second service of a different service provider together with the use of a first service.

Also, the present invention can improve the security when the second service requests personal information in using the second service together with the use of the first service.

As many apparently widely different embodiments of the present invention can be made without departing from the spirit and scope thereof, it is to be understood that the invention is not limited to the specific embodiments thereof except as defined in the claims.

What is claimed is:

1. An information processing system including a user device, a first service providing device and a second service providing device, said first service providing device being different from said second service providing device,
    wherein said user device comprises:
    acquisition means for acquiring a first service object and a second service object via a network, the first service object being used for a first service provided from said first service providing device, and the second service object being used for a second service provided from said second service providing device;
    setting means for setting user information in the second service object acquired by said acquisition means;
    transfer means for transferring the second service object to said first service providing device in order to use the first service of the first service providing device via the first service object, the second service object holding the user information set by said setting means; and
    first service use means for using the first service of said first service providing device via the first service object,
    and wherein said first service providing device comprises:
    receiving means for receiving the second service object transferred by said transfer means, the second service object holding the user information set by said setting means; and
    second service use means for using the second service of said second service providing device based on the second service object received by said receiving means.

2. The system according to claim 1, wherein the user information held in the second service object transferred by said transfer means cannot be referred to by said first service providing device.

3. The system according to claim 1 further including at least one server, wherein said server comprises:
    registering means for registering service objects provided by a plurality of service providing devices; and
    searching means for searching a desired service object based on a user request.

4. The system according to claim 1, wherein said user device further comprises ID acquisition means for acquiring a session ID by communicating with the second service providing device via the second service object acquired by said acquisition means,
    and wherein said transfer means transfers the session ID acquired by said ID acquisition means and the second service object holding the user information to the first service providing device, and wherein said second service use means uses the service of the second service providing device based on the session ID and the second service object transferred from said transfer means.

5. The system according to claim 1, wherein the user information held by the second service object is encrypted.

6. An information processing apparatus comprising:
    acquisition means for acquiring a first service object and a second service object via a network, the first service object being used for a first service provided from a first service providing device, and the second service object being used for a second service provided from a second service providing device, said first service providing device being different from said second service providing device;
    setting means for setting user information in the second service object acquired by said acquisition means;
    transfer means for transferring the second service object to said first service providing device in order to use the first service of the first service providing device via the first service object, the second service object holding the user information set by said setting means; and
    service use means for using the first service of said first service providing device via the first service object,
    wherein said first service providing device receives the second service object transferred by said transfer means, and uses the second service of the second service providing device based on the received second service object holding the user information.

7. The information processing apparatus according to claim 6, wherein said acquisition means acquires the second service object when the first service object requires the second service of the second service providing device.

8. The information processing apparatus according to claim 6, wherein said acquisition means accesses a server registering a plurality of service objects provided by a plurality of service providing devices, and searches for and acquires a desired service object from the server.

9. The information processing apparatus according to claim 6, further comprising:
    communication means for communicating with the second service providing device via the second service object acquired by said acquisition means; and
    ID acquisition means for acquiring a session ID for performing a session with the second service providing device,
    wherein said transfer means transfers the session ID and the second service object holding the user information to the first service providing device,
    and wherein said first service providing device uses the service of the second service providing device based on the session ID and the second service object transferred from said transfer means.

10. A method of controlling an information processing system including a user device, a first service providing device, and a second service providing device, the first service providing device being different from said second service providing device, wherein the user device performs the steps of:
    an acquisition step of acquiring a first service object and a second service object via a network, the first service object being used for a first service provided from said first service providing device, and the second service object being used for a second service provided from said second service providing device;
    a setting step of setting user information in the second service object acquired in the acquisition step;

a transfer step of transferring the second service object to the first service providing device in order to use the first service of the first service providing device via the first service object, the second service object holding the user information set by the setting step; and a first service use step for using the first service of the first service providing device via the first service object, wherein the first service providing device performs a second service use step of using the second service of said second service providing device based on the second service object received by said receiving step.

11. The method according to claim 10, wherein the user information held in the second service object transferred in the transfer step cannot be referred by the first service providing device.

12. The method according to claim 10, wherein the system further includes at least one server, and wherein said server performs a registering step of registering service objects provided by a plurality of service providing devices, and searches for a desired service object based on a user request.

13. The method according to claim 10, wherein the user device further performs an ID acquisition step of acquiring a session ID by communicating with the second service providing device via the second service object acquired in the acquisition step, and wherein in the transfer step, the session ID acquired by the ID acquisition step and the second service object holding the user information are transferred to the first service providing device, and wherein in the second service use step, the service of the second service providing device is used based on the session ID the second service object transferred in the transfer step.

14. The method according to claim 10, wherein the user information held by the second service object is encrypted.

15. An information processing method comprising:

an acquisition step of acquiring a first service object and a second service object via a network, the first service object being used for a first service provided from a first service providing device, and the second service object being used for a second service provided from a second service providing device, the first service providing device being different from the second service providing device;

a setting step of setting user information in the second service object acquired in the acquisition step;

a transfer step of transferring the second service object set by the setting step to the first service providing device in order to use the first service of the first service providing device via the first service object, the second service object holding the user information set by the setting step; and a service use step for using the first service of the first service providing device via the first service object, wherein the first service providing device receives the second service object transferred by the transfer step, and uses the second service of the second service providing device based on the received second service object holding the user information.

16. The method according to claim 15, wherein in the acquisition step, the second service object is acquired when the first service object requires the second service of the second service providing device.

17. The method according to claim 15, wherein in the acquisition step, a server registering a plurality of service objects provided by a plurality of service providing devices is accessed to search for and acquire a desired service object from the server.

18. The method according to claim 15, wherein the method further comprises:

a communication step of communicating with the second service providing device via the second service object acquired in the acquisition step, and an ID acquisition step of acquiring a session ID for performing a session with the second service providing device, wherein in the transfer step, the session ID and the second service object holding the user information are transferred to the first service providing device, and wherein the first service providing device uses the service of the second service providing device based on the session ID and the second service object transferred in the transfer step.

19. A computer-readable memory medium which stores a control program executable by a computer, wherein the computer executes the control program to realize an information processing method comprising:

an acquisition step of acquiring a first service object and a second service object via a network, the first service object being used for a first service provided from a first service providing device, and the second service object being used for a second service provided from a second service providing device, the first service providing device being different from the second service providing device;

a setting step of setting user information in the second service object acquired in the acquisition step;

a transfer step of transferring the second service object set by the setting step to the first service providing device in order to use the first service of the first service providing device via the first service object, the second service object holding the user information set by the setting step; and a service use step of using the first service of the first service providing device via the first service object, wherein the first service providing device receives the second service object transferred by the transfer step, and uses the second service of the second service providing device based on the received second service object holding the user information.

* * * * *